(No Model.)
G. B. PRESCOTT, Jr.
CUT-OUT FOR SECONDARY BATTERIES.
No. 327,964. Patented Oct. 6, 1885.
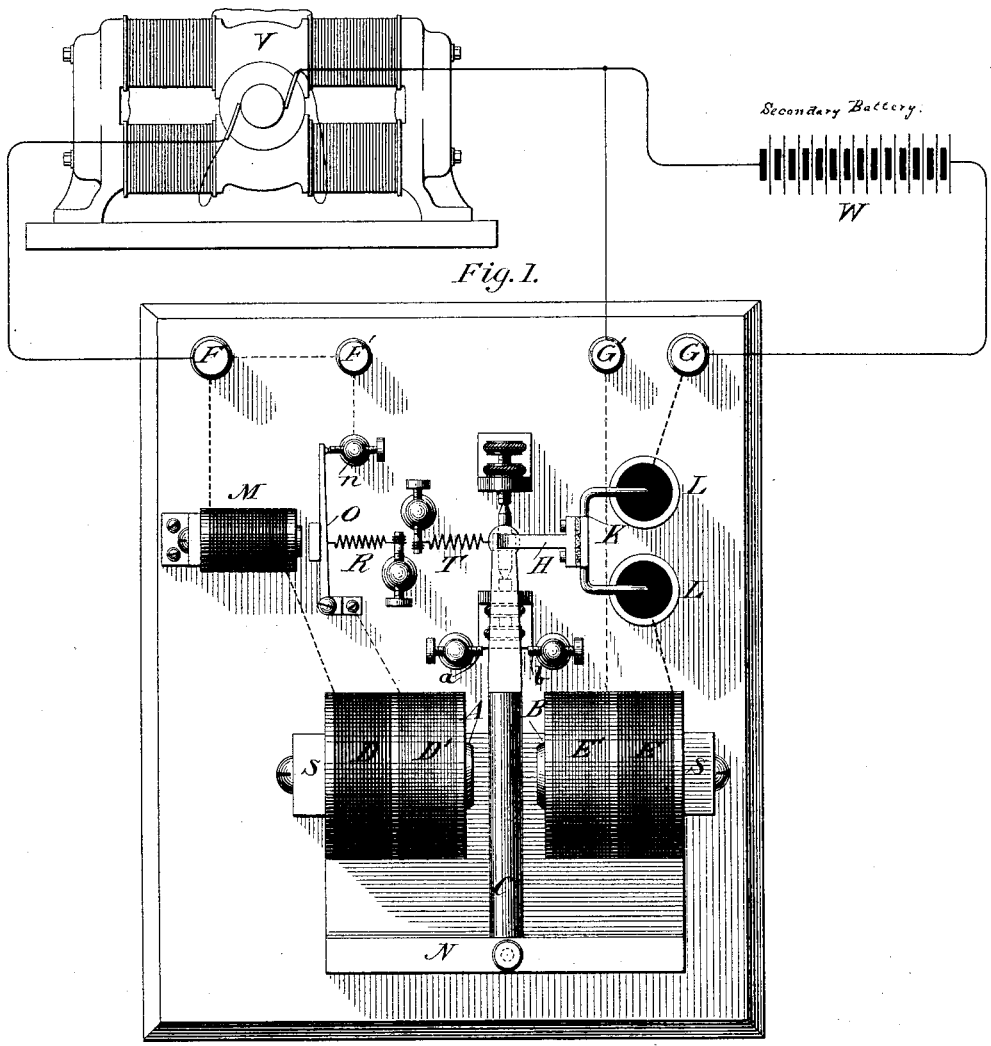
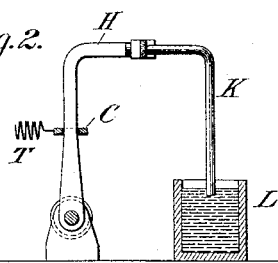
Attest:
Inventor:
George B. Prescott Jr.

UNITED STATES PATENT OFFICE.

GEORGE B. PRESCOTT, JR., OF NEWARK, N. J., ASSIGNOR TO THE UNITED STATES ELECTRIC LIGHTING COMPANY, OF NEW YORK, N. Y.

CUT-OUT FOR SECONDARY BATTERIES.

SPECIFICATION forming part of Letters Patent No. 327,964, dated October 6, 1885.

Application filed April 27, 1885. Serial No. 163,506. (No model.)

*To all whom it may concern:*

Be it known that I, GEORGE B. PRESCOTT, Jr., a citizen of the United States, residing at Newark, in the county of Essex and State of New Jersey, have invented certain new and useful Improvements in Cut-Outs for Secondary Batteries, of which the following is a specification, reference being had to the drawings accompanying and forming a part of the same.

My invention relates to devices for connecting and disconnecting secondary batteries from the dynamo-machines by which they are charged, and which are commonly known as "secondary battery cut-outs." The apparatus which I have invented is entirely automatic in its action, and is designed to connect a secondary battery with the charging-dynamo when the latter has raised the electro-motive force to a given point, to disconnect the secondary battery from the dynamo when the electro-motive force of the battery approaches or exceeds that of the dynamo, and, also, to interrupt the circuit between the dynamo and battery when a sudden fall of the electro-motive force produced by the dynamo occurs—as by the slipping of the driving-belt or like cause.

Figure 1 shows the cut-out apparatus in plan and the machine and battery with which it is employed. Fig. 2 is a sectional view of a detail of the apparatus.

I employ any convenient form of base upon which is mounted a device similar in principle of construction to an ordinary polarized relay. This consists of a permanent magnet of which one pole is at N, the other in the two arms S S—N being of north and S S being of south polarity.

To the poles S S are secured the soft-iron cores A B, and to the pole N is pivoted the soft-iron lever C, in a position to vibrate between the ends of the two cores A B. Each core A B is wound with two coils of insulated wire, D D' E E', the coils D and E being of a coarse wire of low resistance, the others of fine wire of comparatively high resistance. Coils D E are in the circuit which terminates at the binding-posts F G, and coils D' E' are in a circuit of the terminals at the binding-posts F' G'.

The lever C is connected with a pivoted arm, H, that carries a bent wire, K, the ends of which are arranged to be immersed in the mercury-cups L, or raised therefrom by the movement of the arm. The circuit through coils D E is closed only when the wire K dips into the mercury in cups L, and this circuit contains a small electro-magnet, M. The pivoted armature O for this magnet has a back stop, *n*, and is connected with the circuit through coils D' E', so that said circuit is completed only when the armature is in contact with its stop.

Springs R and T are connected with armature-levers O and C, respectively, spring R exerting a force tending to hold the lever O in contact with its back stop, and spring T acting to draw the lever C over toward the pole A and upon one of the stops *a b* that limit its movement.

The operation of the apparatus is as follows: The instrument is connected up in circuit with a dynamo-machine, V, and a secondary battery, W, the wires of the circuit being connected to binding-posts F G. The post F' is connected with the post F, and post G' is connected with the charging-circuit between the battery and the machine. A circuit including the fine-wire coils D' E' is thus formed, which is closed when the machine is not in operation. The circuit under these conditions is interrupted through the coils D E, the bent wire K being lifted out of the mercury-cups L by the action of the spring T, that draws the lever C over toward the pole A, so that it is not attracted indifferently by the pole to which it happens to be nearer.

On starting the machine the current flows through the coils D' E' in a direction to reverse the magnetism of pole A and increase that of pole B. The lever C is consequently repelled by pole A and strongly attracted by pole B. The retractible spring T is, however, so adjusted that it counteracts the tendency of the armature to move toward B until the electro-motive force of the dynamo has reached a predetermined limit. This limit must be of course an electro-motive force greater than that of the battery to be charged, and as soon as it is reached the armature moves over to B, closing the break at the mercury-cups L L and permitting the whole dynamo-current to pass through the battery. The main coils D E then hold the lever C in this position, the magnet M having become energized and interrupted the circuit through coils D' E' by attracting the armature O.

As the battery becomes charged, its electro-motive force, which opposes that of the dynamo rises, and when it approximates that of the dynamo the current circulating in the coils D E become too feeble to maintain the lever C in a position opposed by the action of the spring T. The lever C therefore recedes to its original position and interrupts the main circuit at the mercury-cups. The same conditions would obtain and the cut-out would act in the same manner should the electro-motive force produced by the dynamo fall or disappear from any cause, as would be the case should the driving-belt break or slip off. In the case of a sudden cessation of electro-motive force, however, the reverse current from the batteries might traverse the circuit before the retractile spring could act—an occurrence common with ordinary forms of cut-out; but in such case the action of the polarized magnet prevents any serious consequences, for this reverse current makes a north pole of B, and increases the south polarity of A, besides being assisted by spring T. The main current is thus interrupted at the mercury-cups, as before, and the reverse or back current is rendered harmless by its own action.

When once properly adjusted the cut-out requires no further attention. It will connect the dynamo to the batteries whenever the electro-motive force produced by the former has reached a predetermined limit, and disconnect it whenever the electro-motive force falls below the limit, and when the battery or batteries become charged. It may be located with the battery or at any point in the circuit. My invention therefore involves a circuit-breaker in the charging-circuit operated or controlled by a polarized electro-magnet having two coils or sets of coils, one in the main circuit, the other in a derived or shunt-circuit around the dynamo, and a circuit-breaker in the derived circuit controlled by an electro-magnet in the main. These elements or devices when arranged for operation in the manner herein described may be constructed in any manner that is most convenient or desirable.

What I claim is—

1. The combination, with a dynamo-machine and a secondary battery or batteries, of a circuit-breaker in the main or charging circuit, a polarized electro-magnet with coils in the main circuit and in a circuit around the dynamo for operating the circuit-breaker, a circuit-breaker in the derived circuit, and an electro-magnet in the main for operating the same, substantially as set forth.

2. The combination, with a dynamo-machine and a secondary battery, of a circuit-breaker in the charging-circuit, an electro-magnet for operating the same, consisting of an armature of one polarity arranged to vibrate between poles of the opposite polarity wound with two sets of coils, one of which is in the main circuit, the other in a derived circuit around the dynamo, a circuit-breaker in the derived circuit, and a magnet in the main for operating or controlling the same, as set forth.

3. The combination, with a dynamo-machine and a secondary battery, of a circuit-breaker in the charging-circuit, a device for controlling the same consisting of a permanent magnet with an armature pivoted to one pole and arranged to vibrate between cores secured to the other pole, each of the said cores being wound with two coils, one in the main circuit, the other in a derived or shunt-circuit around the dynamo, a circuit-breaker in the derived circuit, and a magnet in the charging-circuit for operating or controlling the same, as set forth.

4. The combination, with a dynamo-machine and a secondary battery, of a circuit-breaker in the charging-circuit, an electro-magnet for controlling the same, consisting of a pivoted and spring-controlled armature of one polarity arranged to vibrate between poles of the opposite polarity, each of said poles being wound with two coils of coarse and fine wire, respectively, the coarse-wire coils being included in the main circuit, and the fine-wire coils in a derived circuit around the dynamo, a circuit-breaker in the derived circuit, and a magnet in the charging-circuit for operating or controlling the same, as set forth.

GEO. B. PRESCOTT, JR.

Witnesses:
RICHARD WM. BLOEMEKE,
JOHN THOMPSON.